United States Patent Office 3,075,807
Patented Jan. 29, 1963

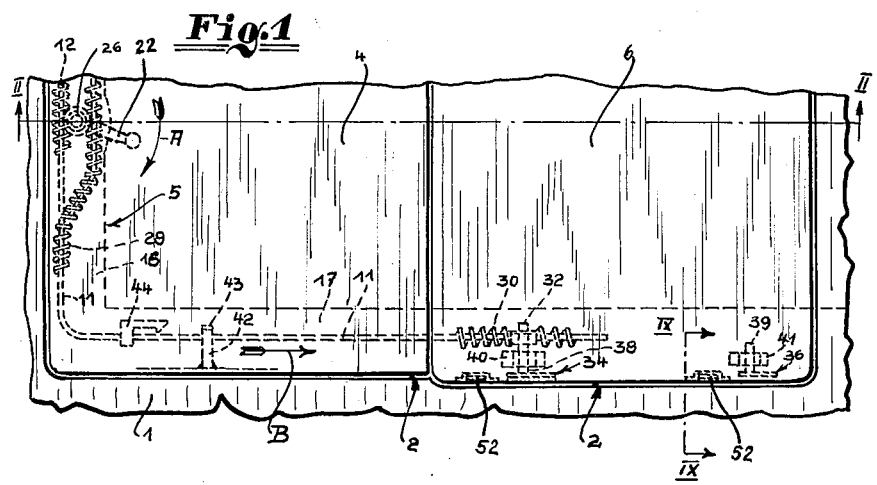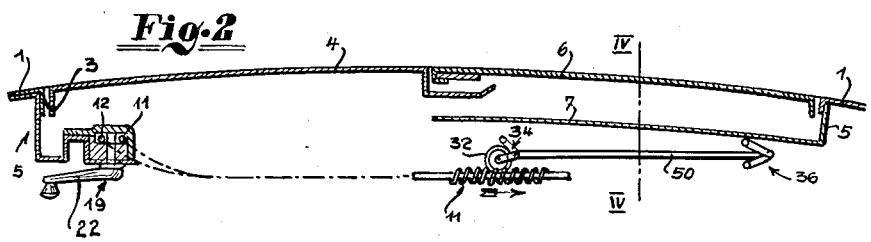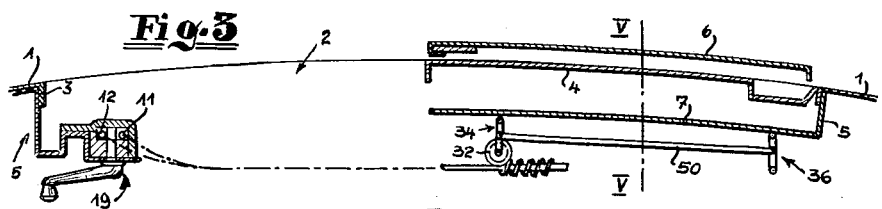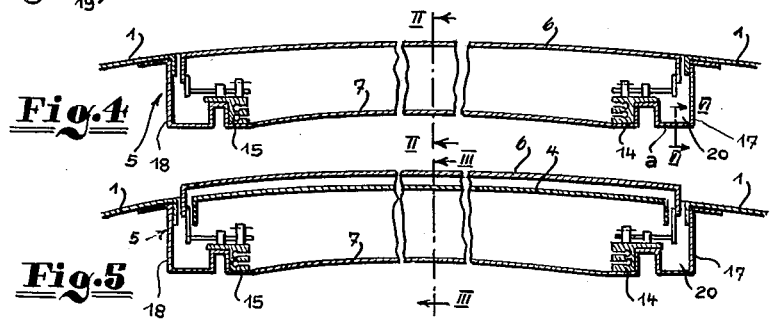

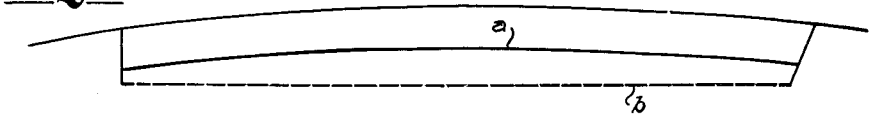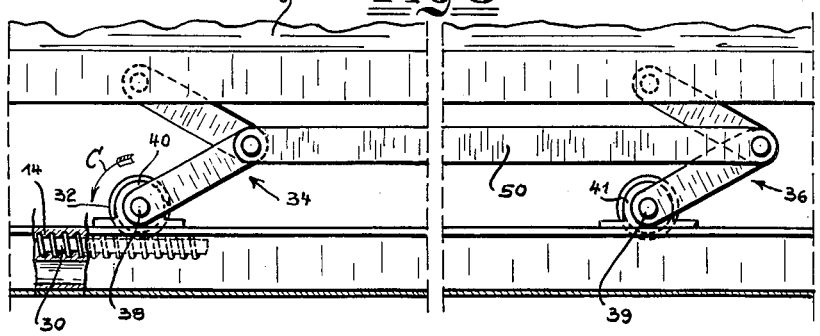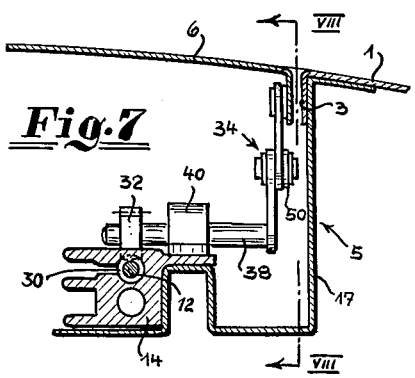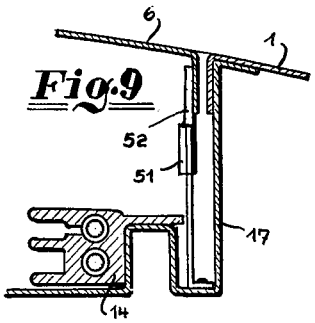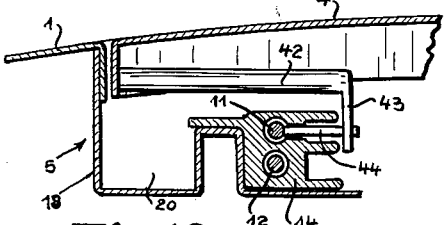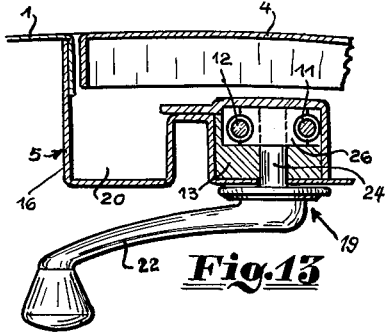

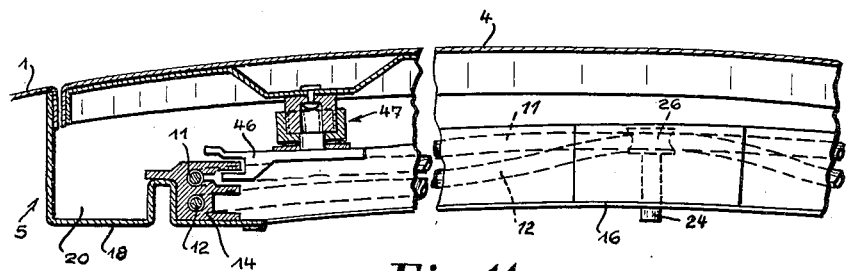
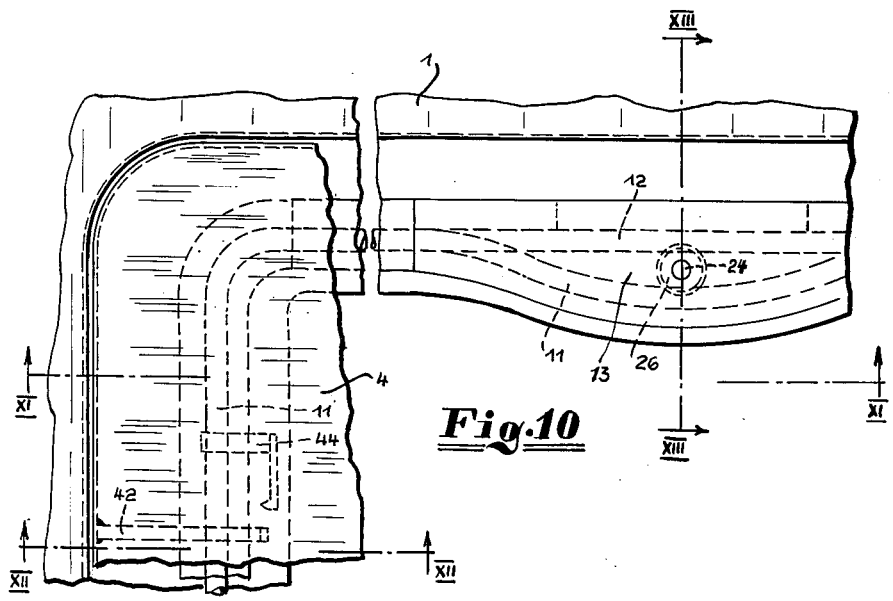

3,075,807
SLIDING PANEL CONSTRUCTION FOR PASSENGER CARS
Johannes Werner, Offenbach (Main), Germany, assignor to H. T. Golde G.m.b.H. & Co. K.G., Frankfurt am Main, Germany
Filed July 19, 1961, Ser. No. 125,199
Claims priority, application Germany July 20, 1960
5 Claims. (Cl. 296—137)

This invention relates to passenger cars having a sliding roof portion, and more particularly a sliding panel by which an opening in the vehicle roof may be closed.

In conventional structures, a sliding panel is generally arranged flush with the associated vehicle roof when in closed position. Therefore, the panel has to be lowered beneath the level of the fixed roof before rearward movement of the panel into open position can take place. After a lowering of the panel, the sliding movement to open position is guided by guide rails attached to lateral parts of a reinforcing frame which frame is generally fixed to the vehicle roof at the lower surface thereof and connected to the borders of the roof opening. It is obvious that a certain overall height of the assembly comprising the reinforcing frame and the guide rails is necessary to allow for the vertical movement of the panel when in its foremost position.

In many modern passenger cars, the height of the passenger compartment is reduced to such an extent that providing a sliding panel construction meets with serious problems since the head room of the passenger compartment is additionally reduced by the frame-guide rail assembly for the sliding panel.

It is an object of this invention to provide a sliding panel construction for passenger cars without necessitating any vertical movement of the sliding panel, thus requiring less height of the passenger compartment for installation of the frame-guide rail assembly.

It is a further object of this invention to provide guide means for the sliding panel which are simple and reliable in operation and in which no vertical movement of the panel is imposed on the sliding movement thereof.

It is another object of this invention to provide a sliding panel construction wherein when the sliding panel is in its closed position, parts projecting over the surface of the vehicle roof are avoided.

It is another object of this invention to provide a sliding roof construction which can be readily inserted into a roof opening from above and simply fixed to the borders of said opening along all four sides thereof thus saving time, labor and cost.

In accordance with this invention a sliding panel construction for a passenger car having an opening in its roof comprises in combination a reinforcing frame below the surface of said roof and fixed to the borders of said opening, guide rails attached to the lateral portions of said frame, a first panel flush with said roof and mounted for sliding movement along said rails between a foremost closed and a rearmost fully open position, guide shoes attached to the panel in constant engagement with said rails, said frame and said rails and said opening extending rearwardly beyond said first panel in its forward position, a second panel normally flush with said roof within the rear part of said opening and mounted for upward movement, means for moving said second panel upward between its normal flush position and a raised position in which said second panel lies above the path of the sliding movement of said first panel and means for slidably moving said first panel, said last-mentioned means being operatively connected to said means for moving said second panel upward.

Preferably said means for moving said second panel upward are arranged and constructed to impart a vertical movement to said panel while alternatively said panel may be pivotally mounted for swinging out of the path of said first panel or for a combined swinging and lifting movement.

The various features of novelty which characterize this invention are pointed out with particularity in the claims annexed to and forming part of this specification. For a better understanding of the invention, its advantages and specific objects, reference is made to the accompanying drawings and descriptive matter in which there is illustrated and described by way of example an embodiment of the invention.

In the drawings:

FIG. 1 is a diagrammatic top plan view, partly broken away, of the left hand half of a vehicle roof showing a sliding panel construction according to the invention with the sliding panel in its closed position;

FIG. 2 is a diagrammatic central sectional view along line II—II of FIG. 1;

FIG. 3 is a view similar to FIG. 2 but with the sliding panel in its open position;

FIG. 4 is a diagrammatic vertical sectional view along line IV—IV of FIG. 2;

FIG. 5 is a sectional view similar to FIG. 4 along line V—V of FIG. 3, i.e. with the sliding panel in its open position;

FIG. 6 is a graph for comparison of the longitudinal inclinations of draining gutters according to the prior art (b) and according to the invention (a);

FIG. 7 is an enlarged view of the right hand part of FIG. 5;

FIG. 8 is a sectional view taken along line VIII—VIII of FIG. 7;

FIG. 9 is an enlarged sectional view along line IX—IX of FIG. 1;

FIG. 10 is an enlarged view of the left hand part of FIG. 1;

FIGS. 11, 12 and 13 are sectional views taken along lines XI—XI, XII—XII and XIII—XIII, respectively, of FIG. 10.

The basic features of the invention will be best seen in FIGS. 1–5 while details may be better seen in FIGS. 7–13, and one special advantage of the invention will be explained in connection with the graph according to FIG. 6.

In the drawings a roof 1 of a passenger car is provided with an opening 2. As will be best seen in FIGS. 1 and 2 the opening extends rearward beyond a sliding panel 4 and is closed by this first panel 4 and a second panel 6 behind the sliding panel 4. Both panels 4 and 6 are flush with the fixed roof 1 when the roof opening is closed.

The fixed vehicle roof 1 is bent downwardly forming a flange 3 along the borders of the opening 2. A reinforcing frame 5, supporting the panels 4 and 6 and extending along all four sides of the roof opening 2 is fixed to this flange 3, for instance by spot welding. The rear part of the frame 5 is rigidly connected and is preferably integral with a tray or plate 7 covering the sliding roof construction from below. It has to be noted that installation of the frame 5 is greatly facilitated since the roof opening 2 is large enough to allow insertion of the frame from the outside of the vehicle roof through the opening 2 whereas in conventional constructions having a roof opening corresponding merely to the size of a sliding panel the installation is to be effected from the inside of the vehicle by bringing the panel inside the vehicle through a door thereof to a position partly underneath the fixed roof where connecting points are not readily accessible and wherein it may be necessary to dismantle the inner lining of the fixed roof.

As will be best seen from FIGS. 2 and 3 the sliding panel 4 is arranged only for sliding movement longitudinally of the vehicle while the second panel 6 is arranged to move upward, out of the path of the sliding panel 4, before longitudinal rearward movement into open position of the sliding panel is started. The second panel will correspondingly be moved downward back into its normal position flush with the vehicle roof 1 as soon as the sliding panel 4 has reached its foremost position to close the roof opening.

Mounting and actuating means for both panels may be of any convenient construction. According to the embodiment shown in the drawings two lengths 11 and 12 of flexible cable are arranged for axial movement in guides 13, 14, 15 which guides are fixed to the front cross portion 16 and the lateral portions 17, 18, respectively, of the roof frame 5. A common drive 19 is provided for axial movement of both cable lengths 11 and 12 and each cable length is operatively connected to separate actuating means for both panels at one side of the roof opening, as will be described later in detail.

From the foregoing explanations it may already be derived that the main difference of a sliding panel construction according to this invention is to be seen in that the roof opening is not restricted to the area of the sliding panel 4 but extends rearwards to about the double length of the sliding panel and that the roof portion behind the sliding panel 4 is constituted by a movable panel 6, normally flush with the fixed vehicle roof 1 but adapted to clear the path of the sliding panel 4. Thereby a basic advantage is obtained in that provision for lowering the sliding panel to a plane beneath the fixed roof 1 can be dispensed with.

Since the panel 4 can be guided on a higher level correspondingly less overall height is required for the frame 5, to the lateral portions of which frame guide rails for the panel 4 may be fixed as usual and as will be described below. With the saving of frame height a serious hindrance to the installation of sliding panels in low-construction passenger cars is overcome.

Moreover, another important advantage is obtained since with the sliding panel sliding substantially flush with the fixed vehicle roof the guide rails as well as the lateral frame portions supporting them may extend generally parallel to the longitudinal curvature of the vehicle roof. By this curvature the longitudinal inclination of the draining gutter as customarily formed in the lateral frame portions is considerably increased. From the schematic drawing of FIG. 6 (see also section line VI—VI of FIG. 4) it may be seen that the longitudinal inclination or curvature $a$ of the base of a U-section draining gutter 20 formed in the frame 5 is considerably increased as compared with rather insufficient inclination $b$ obtainable in conventional sliding panel constructions where the frame height has to be increased, especially in its central portion, in order to allow for vertical movement of at least the rear portion of the sliding panel.

Therefore, two serious problems arising in connection with sliding panel constructions in modern low-construction cars are solved by this invention, i.e. the saving of head room in the passenger compartment and the provision of sufficient inclination of the water channels for efficient drainage.

Details of the actuating and driving means for both panels 4 and 6 will now be described especially with regard to FIGS. 1 and 7 to 13. A driving means consisting of a handle 22 fixed to a shaft 24 carrying rigidly connected thereto a pinion or wormgear 26 is rotatably mounted in a slightly enlarged central portion of the guide means 13 which is rigidly mounted on the front cross portion 16 of the roof frame 5. The two lengths of cable 11 and 12 are provided with threaded or screw-like surfaces at least over those two portions 28 and 30, respectively, which extend in the region of the pinion 26 and of another pinion or wormgear 32 which is connected to the second panel 6. The cables 11 and 12 are guided in bores of the guides 13, 14, 15 from a position with both cables in a horizontal plane in the central portion of guide 13 and near the pinion 26 to a superimposed position in the lateral guides 14 and 15, which guides are also serving as guide rails for the sliding panel 4.

As will be best seen from FIGS. 7 and 8 the rear panel 6 has front and rear toggle lever connections 34 and 36, respectively, to axles 38 and 39, which are rotatably mounted in brackets 40 and 41 fixed to the lateral guides. The front axle 38 has fixed thereto the pinion 32 which is engaged by the rear threaded portion 30 of the cable 11 as shown in FIG. 1 for the left-hand portion of the sliding roof construction while the right-hand portion is constructed in the same manner and, therefore, need not be described. The threaded portion 30 has a length which corresponds to the angle of revolution of pinion 32 necessary to actuate the toggle lever connection for lifting and lowering the panel 6.

The sliding panel 4 is provided with lateral, front and rear guide shoes of any suitable construction, which are in constant engagement with inwardly directed upper flanges of the lateral guides 14 and 15, one such front guide shoe 46 being shown by way of example only in FIG. 11 as connected to the panel 4 by screw means 47 for vertical adjustment. A simple rigid connection may be used instead of the screw means shown, but the screw means may be useful for adjusting the panel 4 exactly flush with the fixed roof 1, for instance on occasion of first installation of the sliding panel construction or if reinstallment takes place after overhauling. The panel 4 has also fixed thereto a rigid arm 42 with a downward extension 43 for engagement with an angle lever 44, rigidly attached to and movable together with the cable 11. As shown in FIG. 12, the guide rail 14 is slotted along its upper bore to enable the angle lever 44 to be connected to the cable 11 guided in this upper bore.

As will be clearly apparent especially from FIG. 1, turning the handle 22, for instance, as indicated by arrow A will move both cables 11 and 12 axially. Therefore, considering cable 11, this cable will be shifted backwards as indicated by arrow B (FIG. 1) thereby rotating pinion 32 as indicated by arrow C (FIG. 8) to actuate the toggle lever 34 and by means of the connecting rod 50 also the toggle lever 36. The toggle levers are thus actuated to lift the second panel 6 before the angle lever 44 engages the extension 43 of the arm 42. Thereafter, the sliding panel 4 is moved to the rear, i.e. to open position by further turning the handle 22 in the direction of arrow A as soon as the extension 43 has been engaged by the lever 44, for instance under spring action (not shown) which engagement will be released by turning the handle in the opposite direction, and when the panel 4 has reached its foremost closed position. Thereafter, further rotation of the handle 22 will result in lowering the second panel 6 as soon as the pinion 32 is again engaged by the threaded cable portion 30.

The foregoing description of an embodiment of the invention is only by way of example and it is contemplated that many alterations and other embodiments are possible within the scope of the invention for anyone skilled in the art, the main feature of the invention consisting in providing an upwardly movable or displaceable panel aligned with a sliding panel to enable the sliding panel to be moved backward and forward without any necessity of superimposing a vertical movement to its sliding movement, whereby a roof frame of less height can be used as compared with conventional sliding panel constructions, while a smooth upper surface of the vehicle roof is maintained when the roof opening is closed. Many unexpected advantages are obtained as for instance the improved drainage as a result of increased inclination of the lateral water channels. Installation of the sliding roof construction is also greatly facilitated since the roof frame with all accessories can be inserted from above into the comparatively large roof aperture the size of which corresponds to that of the frame, while in conventional constructions guide rails and the frame supporting them have to extend rearward underneath a fixed roof portion which renders their installation rather complicated.

Means for guiding the rear panel 6 for vertical movement are shown in FIGS. 1 and 9 consisting of a hollow guiding bracket 51 rigidly connected to the roof frame 5 and a rod 52 rigidly connected to the panel 6 and guided for vertical movement within the bracket 51.

I claim:

1. A sliding panel construction for a passenger car having an opening in its roof, comprising in combination a reinforcing frame below the surface of said roof and fixed to the roof adjacent said opening, guide rails attached to said frame, a first panel flush with said roof and mounted for sliding movement along said rails between a foremost closed and a rearmost fully open position, guide shoes attached to the panel and in constant engagement with said rails, said frame and said rails and said opening having a greater extent than said first panel, a second panel normally flush with said roof, and in said opening such that said first and second panels together are adapted for closing said opening, said second panel being mounted for upward movement relative to said roof, means for moving said second panel upward between a normal position flush with said roof and a raised position in which said second panel lies above the path of sliding movement of said first panel and means for slidably moving said first panel, said last-mentioned means being operatively connected to said means for moving said second panel upward.

2. A sliding panel construction according to claim 1, wherein said second panel is mounted for vertical movement between its normal flush position and an upper position essentially parallel to said flush position.

3. A sliding panel construction according to claim 1, wherein said reinforcing frame includes a front cross portion and said means for slidably moving said first panel comprises a pinion rotatably mounted on the front cross portion of said reinforcing frame, a cable operatively connected to said pinion for axial movement, a guide for said cable to enable said cable to transmit pushing and pulling forces, said guide consisting of a central section extending along said front cross portion and lateral sections along said lateral portions of said frame, there being provided an elongated slot in each of said lateral guide sections, an element extending through said elongated slot for operatively connecting said cable to said first panel, means operatively connecting said cable to said means for moving said second panel upward, and driving means for rotating said pinion.

4. A sliding panel construction according to claim 3, wherein said means for moving said second panel upward comprises a toggle lever, and actuating means operatively connected to said cable, said lever interconnecting said second panel with said actuating means.

5. A sliding panel construction according to claim 4, wherein said actuating means comprises a section of said cable having a worm-like external surface, a pinion rotatable mounted on said lateral frame portion and adapted to engage said section, said pinion being connected to said toggle lever, whereby actuation of said toggle lever is effected by angular displacement of said pinion caused by axial movement of said cable.

References Cited in the file of this patent

UNITED STATES PATENTS

| | | |
|---|---|---|
| 2,122,712 | Bishop | July 5, 1938 |
| 2,973,991 | Werner | Mar. 7, 1961 |
| 2,985,483 | Bishop et al. | May 23, 1961 |

FOREIGN PATENTS

| | | |
|---|---|---|
| 433,065 | Great Britain | Aug. 8, 1935 |